United States Patent [19]

Mark et al.

[11] Patent Number: 5,331,401
[45] Date of Patent: Jul. 19, 1994

[54] METHOD AND APPARATUS FOR CONTROLLING DITHER IN A MULTIPLE GYRO SYSTEM

[75] Inventors: John G. Mark, Pasadena; Ray D. Dykeman, Agoura; Daniel A. Tazartes, Beverly Hills, all of Calif.; William B. Ware, Fairfield, Conn.

[73] Assignee: Litton Systems, Inc., Beverly Hills, Calif.

[21] Appl. No.: 740,731

[22] Filed: Jun. 3, 1985

[51] Int. Cl.⁵ .................. G01B 9/02; G01C 19/28; H01S 3/083
[52] U.S. Cl. ................. 356/350; 74/5.6 A; 372/94
[58] Field of Search .......... 356/350; 372/94; 73/504; 74/5.6 A, 5.6 D

[56] References Cited

U.S. PATENT DOCUMENTS

| | | | |
|---|---|---|---|
| 3,503,688 | 3/1970 | Lechevalier | 356/350 |
| 3,563,662 | 2/1971 | Wing | 356/350 |
| 4,277,173 | 7/1981 | Ljung et al. | 356/350 |
| 4,597,667 | 7/1986 | Curby et al. | 356/350 |
| 4,601,206 | 7/1986 | Watson | 73/505 X |

*Primary Examiner*—Stephen G. Buczinski
*Attorney, Agent, or Firm*—Elliott N. Kramsky

[57] ABSTRACT

A method and apparatus for controlling dither in a multiple gyro system. Each gyro is driven at a distinct nominal frequency. The resulting gyro motions are measured, then demodulated to determine their cross-axis frequency content. Virtual drive signals are generated in light of the cross-axis interactions, then combined with the nominal drive frequencies in such a way that the measured cross-axis effects, resulting in either signal intermodulation or block coning, are nulled.

13 Claims, 3 Drawing Sheets

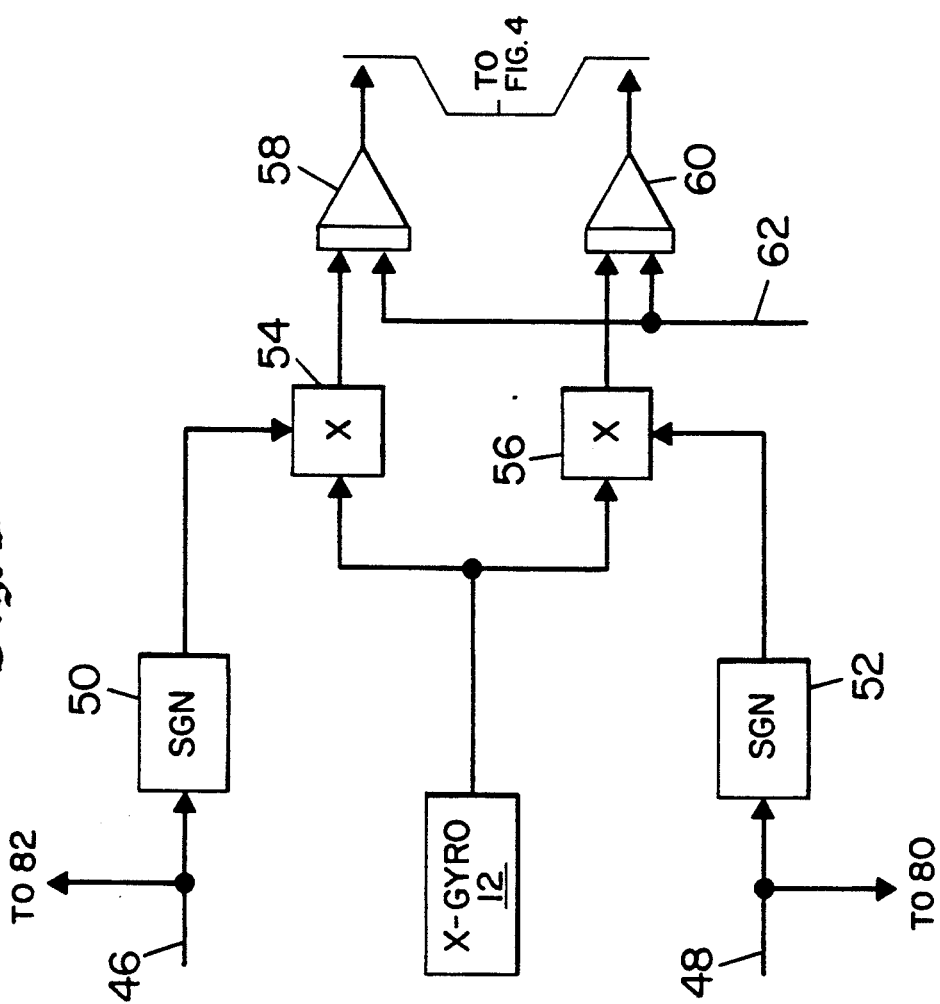
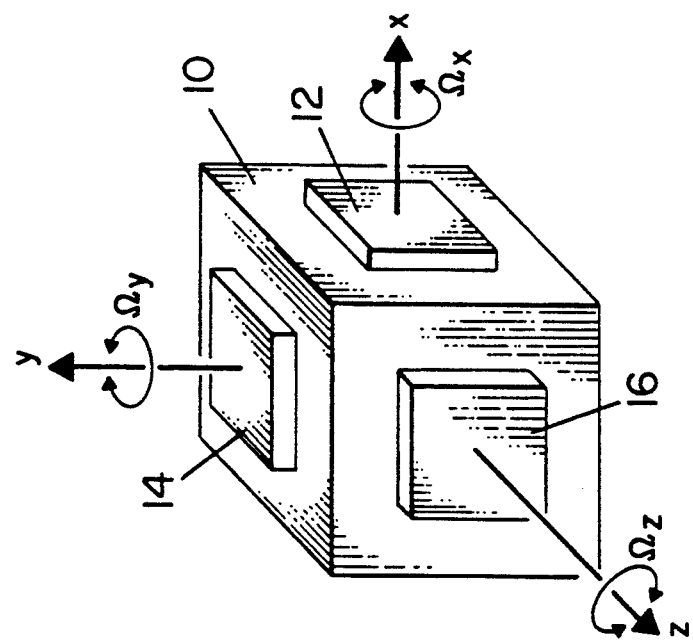

METHOD AND APPARATUS FOR CONTROLLING DITHER IN A MULTIPLE GYRO SYSTEM

BACKGROUND

1. Field of the Invention

The present invention relates to inertial guidance systems. More particularly, this invention pertains to a method and apparatus for controlling the dithering of a plurality of ring laser gyroscopes whereby measurement errors caused by block coning are minimized.

DESCRIPTION OF THE PRIOR ART

The current state of the art of the field of inertial navigation sensors includes the ring laser gyroscope. In such an apparatus, two monochromatic beams of light propagate in opposite directions about a closed path. The gyroscope is mounted symmetrically about, and perpendicular to, a chosen axis of rotation. Rotation of the gyroscope about that axis causes the optical path lengths of the two beams to change relative to one another. As a result, a frequency difference will exist between the two counter-propagating beams. The rotation rate may then be obtained by recombining the beams and analyzing the interference pattern so generated.

When no angular motion occurs about the input axis, the path lengths of the counter-propagating beams are equal and, hence, their frequencies will be the same. Unfortunately, for a range of low (non-zero) rates of rotation, the frequency difference between the two beams is so small that they tend to resonate together, or "lock-in", at a single frequency. As a result, such low rotation rates cannot be measured by the instrument. The angular rate below which the lock-in phenomenon occurs is appropriately termed the lock-in rate.

A relatively common solution to the lock-in problem is to apply a sinusoidal input rate many times the lock-in rate. The actual rotation rate will then be shifted outside the lock-in zone to a level that is readily measurable by the ring laser gyroscope. In this manner, lock-in is prevented except for short periods of time when the instantaneous sinusoidal rate falls below the lock-in threshold. The sinusoidal excitation is known as "dither" and is generally applied to the gyroscope by means of a PZT (piezoelectric transducer) attached to a flexible suspension "flexure") that supports the laser body. Often, the PZT signal also contains a secondary, non-sinusoidal, component to minimize errors that would otherwise occur when the instantaneous sinusoidal rate falls below the lock-in threshold.

Navigation systems typically include three ring laser gyroscopes to permit measurement of rotation about three orthogonal (x, y, and z) axes. The gyros are generally mounted to a common block by means of their flexures. The design of a system including three orthogonally-mounted dithered gyroscopes is complicated by the fact that the performance of such a system may be seriously impaired by errors due to mechanical cross-coupling of the dither motions. One consequence of this cross-coupling is known as instrument block coning. Such an error occurs when one or more of the instrument axes describes a cone in space as a result of simultaneous dither-induced rotations about the three axes.

It is well-known that coning may be eliminated in an ideal system by either (1) dithering the gyros at distinct frequencies or (2) dithering the gyros at the identical frequency and phase. While these approaches would solve the coning problem in such a system, neither scheme can be reasonably expected to work in practice. Some degree of cross-coupling will always exist in a physical system as a result of unavoidable tolerance variations. Consequently, even if each axis were to be driven at a distinct frequency, some of each axis-driven frequency will couple into the outputs of the other axes. In the event that the common frequency components about the different axes are not exactly in phase, coning will occur.

An additional detrimental effect of cross-coupling is the resulting intermodulation present in the gyro dither motion. Since all three dither frequencies are typically "close" the gyro motions will exhibit low frequency "beats" that further degrade accuracy.

The alternative solution to the coning problem (viz. attempting to run the three gyroscopes in-phase at a common frequency) is disclosed in United States patent Ser. No. 4,277,173 of Ljung et al., entitled "Ring Laser Gyroscope Dither Drive Circuit". The system described in that patent teaches the driving of three gyros at a single frequency. Phase detectors measure relative phases between dither rotations, and a servo loop is utilized for adjusting the dither drives so that all block rotations are in-phase. This scheme is extremely sensitive to any unaccounted-for phase shifts in the loop (due to pickoff and pickoff electronics imperfections). Since the overall block motion is relatively large, even a small phase difference in such a scheme may produce relatively large amounts of instrument block coning.

SUMMARY OF THE INVENTION

The present invention overcomes the foregoing and additional problems of the prior art by providing, in a first aspect, an improved method for controlling cross-coupling in a navigation system of the type wherein a plurality of gyroscopes is dithered about a plurality of axes with respect to an instrument block. Such method includes the step of driving each of the gyroscopes at a distinct frequency whereby a predetermined drive frequency is associated with an axis of rotation. Thereafter, the resulting rotations are measured and demodulated to determine the amount of cross axis frequency content. Virtual drive signal components are determined for the cross axis frequencies, then combined with the predetermined frequencies to create new drive signals. The new drive signals are then utilized to drive the gyroscopes and the process repeated.

In a second aspect, the invention provides apparatus for controlling cross-coupling in a system as described above. Such apparatus includes means for driving each gyroscope at a distinct frequency. Means are provided for generating a signal responsive to the movement of each gyroscope and for demodulating each such signal to determine its cross axis frequency content. Means are also provided for deriving virtual drive signal components at the cross axis frequencies and for combining the virtual drive signal components with the axis assigned frequencies.

The preceding and additional features and advantages of the present invention will be better understood and appreciated by reference to the detailed description that follows. This description is accompanied by a set of drawing FIGURES. Numerals point out the features of the invention in the drawings and in the accompanying description, like numerals referring to like features of the invention throughout.

BRIEF DESCRIPTION OF THE DRAWINGS

FIG. 1 is a functional perspective view of a navigation system including an instrument block with three orthogonally mounted dithered gyroscopes;

FIG. 3 is a schematic diagram of the portion of the control system of the invention for demodulating the outputs of the gyroscopes.

DETAILED DESCRIPTION

Figure 2:
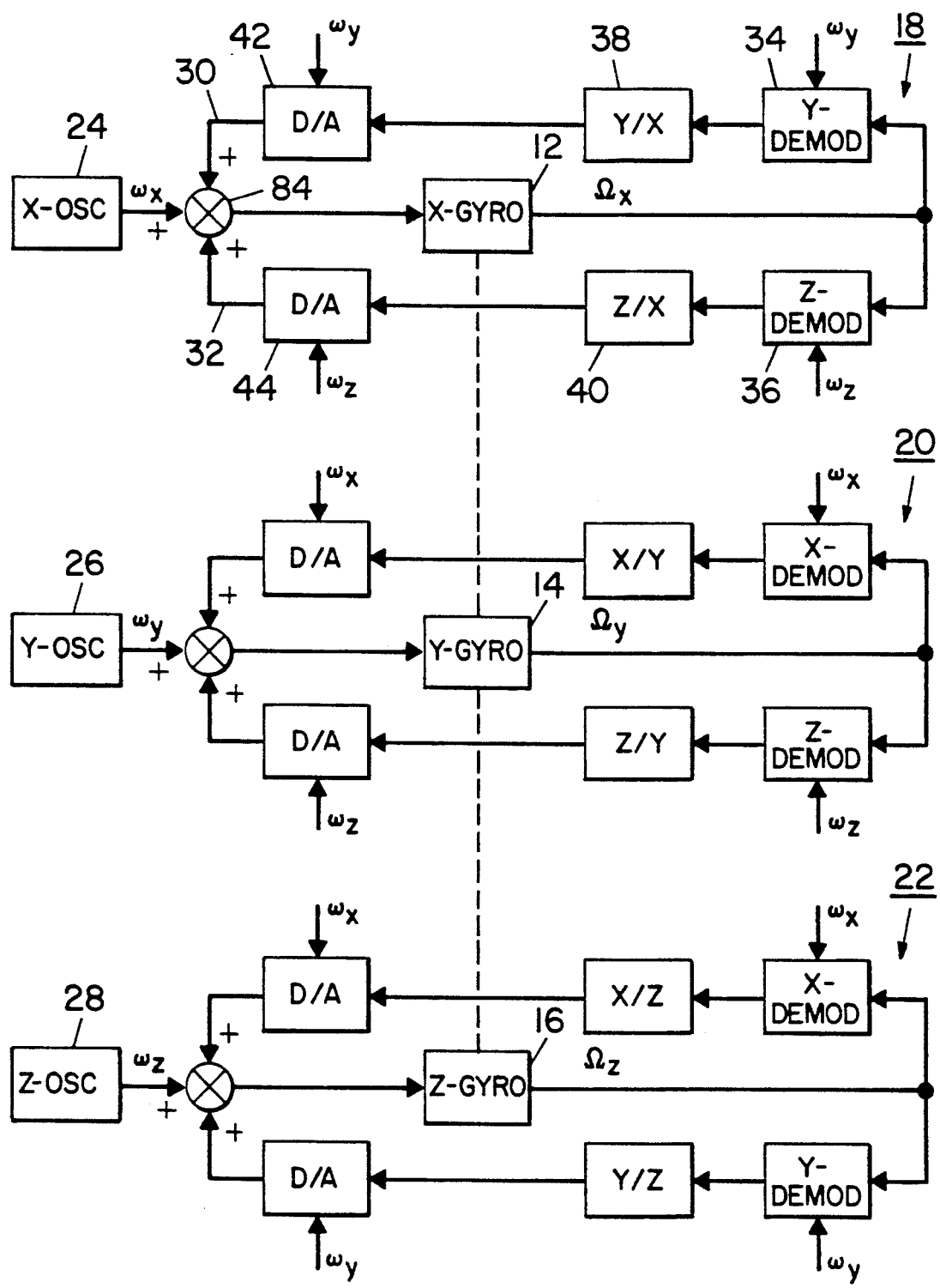
FIG. 2 is a block diagram of the overall system of the invention for controlling instrument block cross-coupling in a mechanical system in accordance with the invention.

Turning now to the drawings, FIG. 1 is a functional illustration of a navigation system including an instrument block 10 with a triad of ring laser gyroscopes 12, 14 and 16 rotatably mounted thereto. The gyroscopes are engaged to the block 10 by means of piezoelectric transducer (PZT)-driven flexures (not shown). Each flexure-and-gyroscope combination forms a mechanical spring-mass system. The PZTs are responsive to applied electric drive signals to induce periodic rotational movements of the gyroscopes 12, 14 and 16 about orthogonal (x, y and z) axes. Permanent magnets (not shown), fixed to the gyroscopes and rotatable therewith, induce electric currents in surrounding coils ("pickoff" signals) that evidence the rotational movements of each of the gyroscopes.

In a system of the type illustrated, block coning or non-axial movement of the block 10 may be induced by the mechanical cross-coupling of rotational effects among the three dithered gyroscopes 12, 14 and 16. Such coning is inherent in an imperfect mechanical system; that is, a system in which currently unavoidable physical assymetries result in the block 10 having a nonuniform distribution of moments of inertia. Since gyroscope output is a function of the square of the coning movement of the block, such movement adds a highly undesirable, non-periodic, time-varying bias to the output signal.

In the present invention, navigation errors due to such coning are minimized. In accordance with a first application, block coning may be eliminated whereas, in a second application, measurement of the coning motion is accuratey measured, allowing its ready subsequent compensation in software. Such compensation will be readily apparent to those skilled in the art. Both applications utilize the teachings of the invention, varying only in accordance with the regulated variable. In the first application, block angular velocity (measured rotation, gyro-to-inertial space, minus pickoff rotation) is servoed to eliminate cross-axis effects, while in a second application, the gyro-to-block (pickoff) signal is servoed. The invention is disclosed and discussion centers upon the latter application. However, the substitution of the indicated variable to achieve the operation of the first application will be readily apparent.

In the invention, each gyroscope is assigned a distinct dither frequency. This differs from approaches such as U.S. Pat. Ser. No. 4,277,173 wherein all gyroscopes are slaved to a master frequency. A demodulation scheme akin to a Fourier transform is employed in the invention to resolve the gyro pickoff signals into their components at the three dither frequencies. A model of the gyro flexure system is employed to estimate the amount of cross-axis drive required to cancel the undesired (cross-axis) components of the pickoff signals. These estimates are then used to modify the PZT drive signals. The resulting dither torques thus include components at the cross-axis as well as at the direct dither frequencies. In this and all future references, "direct axis" applies to those signal components having the frequency assigned to the particular axis under consideration while "cross-axis" refers to those having frequencies assigned to either of the other axes.

FIG. 2 is a block schematic diagram on the overall system for implementing the operation described above. The system includes control loops 18, 20, and 22 for controlling the drive of the x-axis gyro 12, the y-axis gyro 14, and the z-axis gyro 16, respectively. (Each gyro, as represented in FIG. 2, includes associated flexure and pickoff apparatus.) An x-oscillator 24, a y-oscillator 26, and a z-oscillator 28 provide paired (sine and cosine) sinusolds at the assigned reference frequencies ($\omega_x$, $\omega_y$, and $\omega_z$ respectively. The digital oscillators 24, 26 and 28 are employed to maintain the three distinct frequencies, avoiding the dither lock often associated with free running oscillators. Further, the phases of the dither drives can be set by the appropriate mixing of sine and cosine outputs. The preferred relationship between the three frequencies provided by the oscillators 24, 26 and 28 is discussed in detail below.

Each of the control loops 18, 20 and 22 includes apparatus for generating a dither drive signal that includes frequency components for nulling cross-axis effects. By effecting such hulling of cross-axis effects, the accuracy and effectiveness of the gyroscope apparatus are greatly enhanced.

As can be seen from FIG. 2, each of the control loops is of similar configuration and thus the discussion that follows will be limited to the arrangement of the loop 18 for controlling the dithering of the x-axis gyroscope 12. This gyroscope is driven by a dither drive signal applied to the PZTs mounted to its flexure and, responsive to the resulting rotation, provides a pickoff signal at its output. The dither drive signal is synthesized in an arrangement of circuitry that includes two parallel processing paths 30 and 32 for adjusting the signal for driving the x-axis gyro 12 in accordance with the intermodulation detected in the pickoff signal.

The processing path 30 includes a cross-axis demodulator 34 for detecting the component of the x-axis pickoff signal, $\Omega_x$, at frequency $\omega_y$; that is, the assigned y-axis frequency. Within the demodulator block 34, the Fourier coefficients of the sine and cosine terms at frequency $\omega_y$ are derived, providing both magnitude and phase information. Likewise, the demodulator block 36 of the processing path 32 detects the sine and cosine components of the pickoff signal $\Omega_x$ at $\omega_z$. The two demodulators are identical but accept different reference frequencies ($\omega_y$ and $\omega_z$ respectively). Physically, the demodulator outputs represent the amount of intermodulation present in the x-axis pickoff as a result of cross-coupling (indicated by the dashed vertical line between the gyros 12, 14 and 16) between the three instrument block axes. The isolation of the cross-axis components from the overall signal is made possible by the fact that the three reference frequencies are all distinct.

The outputs of the cross-axis demodulators 34 and 36 are applied to frequency response models 38 and 40, respectively. Each of the models accepts, as input, the Fourier expansion coefficients corresponding to the appropriate cross-axis frequency component of the demodulated pickoff signal. The models, an exemplary one of which is shown in detail in FIG. 4, subsequently create a "virtual" drive signal by deriving, from the input Fourier coefficients describing the content of the measured pickoff signal, the Fourier coefficient representation of the amount of direct-axis input required at the particular cross-axis frequency for generating the identical amount of cross-axis-driven signal.

The outputs of the models 38 and 40 are applied to multiplying digital-to-analog converters (DAC's) 42 and 44, respectively. Sinusolds at the cross-axis frequencies are applied to the DAC's 42 and 44, thereby converting the Fourier coefficients to the sine and cosine combinations that represent the appropriate amplitude and phase of signals at the cross-axis frequencies to create that amount of cross-axis frequency content found in the pickoff signal. The frequency response values programmed into the models 38 and 40 are based upon estimates of flexure and gyro response to direct axis driving at the selected cross-axis frequencies. The derived outputs of the models 38 and 40 will not, in all likelihood, equal the values of the signals actually driving the cross-axis gyroscopes. Hence, these signals are appropriately denominated "virtual" drive signals.

The sinusoidal outputs from the DAC's 42 and 44 are combined with the output of the (direct) x-axis oscillator 24 to synthesize a new drive signal, now including components at $\omega_x$, $\omega_y$, and $\omega_z$. The process described above is repeated on a continuous basis as the drive signal is updated in light of the measured pickoff signal. The same process that has been described with respect to the x-axis control loop 18 occurs in substantially identical fashion within the similar apparatus of the y-axis control loop 20 and the z-axis control loop 22. Thus, the drive signals applied to gyros 14 and 16 contain components not only at the direct frequencies ($\omega_y$ and $\omega_z$ respectively), but also at the cross-axis frequencies. The continuous operation of this process minimizes or eliminates intermodulation in all three gyro pickoff signals to thereby improve the accuracy of the overall navigation system.

FIG. 3 is a schematic diagram of a demodulator in accordance with the invention. The arrangement shown may be employed as any one of the cross-axis demodulators of the system, including the y-axis demodulator 34 and the z-axis demodulator 36 of the x-axis control loop 18 by selection of the appropriate reference frequency input. For illustrative purposes, the demodulator of FIG. 3 is shown in detail as the y-axis demodulator 34 of the x-axis control loop 18. This demodulator is arranged to analyze the amount of x-gyroscope 12 pickoff signal $\Omega_x$ at the y-axis assigned frequency $\omega_y$.

As mentioned earlier, the three digital oscillators 24, 26 and 28 generate both sine and cosine outputs at presettable frequencies. Each frequency is selected as an integer multiple of the pickoff sampling frequency (i.e. the inverse of the demodulator accumulation period). Thus an integer number of dither cycles fits within each accumulation period. As all dither frequencies are distinct, the minimum frequency separation is the inverse of the accumulation period. By selecting the three frequencies in this manner, a discrete Fourier transform demodulation scheme may be performed in accordance with the invention. Representative values for the pickoff sampling rate and accumulation period are 2048 Hz and 1 second, respectively. In accordance with the above-referenced relationship between the driving frequencies, therefore, representative dither frequencies of 400 Hz, 401 Hz and 402 Hz would provide the needed separation for the demodulation process.

The cosine and sine of x-oscillator 24 are applied to the y-demodulator 38 along input conductors 46 and 48 respectively. These signals are applied to sign operators 50 and 52 to produce a pair of square waves ninety degrees out of phase with one another and at frequency $\omega_y$. These square waves are then applied to multipliers 54 and 56. The other input to each of the multipliers is the pickoff signal from the x-axis gyroscope 18. (As mentioned above, in the alternative application wherein block coning, rather than intermodulation, is to be driven to "zero" the input to the multipliers 54 and 56 would be the difference between the reading of the x-gyro 12 and the pickoff signal, $\Omega_x$.) The outputs of the multipliers 54 and 56 are then summed in integrators 58 and 60 respectively. Because the square waves take on values of either $+1$ or $-1$, the entire process requires only additions and subtractions rather than actual multiplications followed by summations. This renders the software far more efficient.

The integrators receive an interrupt signal, derived from the system clock, along the line 62. This signal allows the sums to be read out of the integrators 58 and 60 and initializes them to "zero" at the end of each accumulation period. As is well-known in Fourier theory, the sampled outputs of the integrators 58 and 60 are proportional to the coefficients of the cos ($\omega_y t$) and sin terms of the Fourier series expansion representing the pickoff signal. (Alternatively, the Fourier series expansion representing the difference between the actual gyro and pickoff signals. ) Hence, the apparatus of FIG. 3 serves to resolve the $\Omega_y$ component of the pickoff signal. As mentioned above, the specified relationship between the base frequencies and the integration period ensures the feasibility of performing such a demodulation of the pickoff signal.

Figure 4:
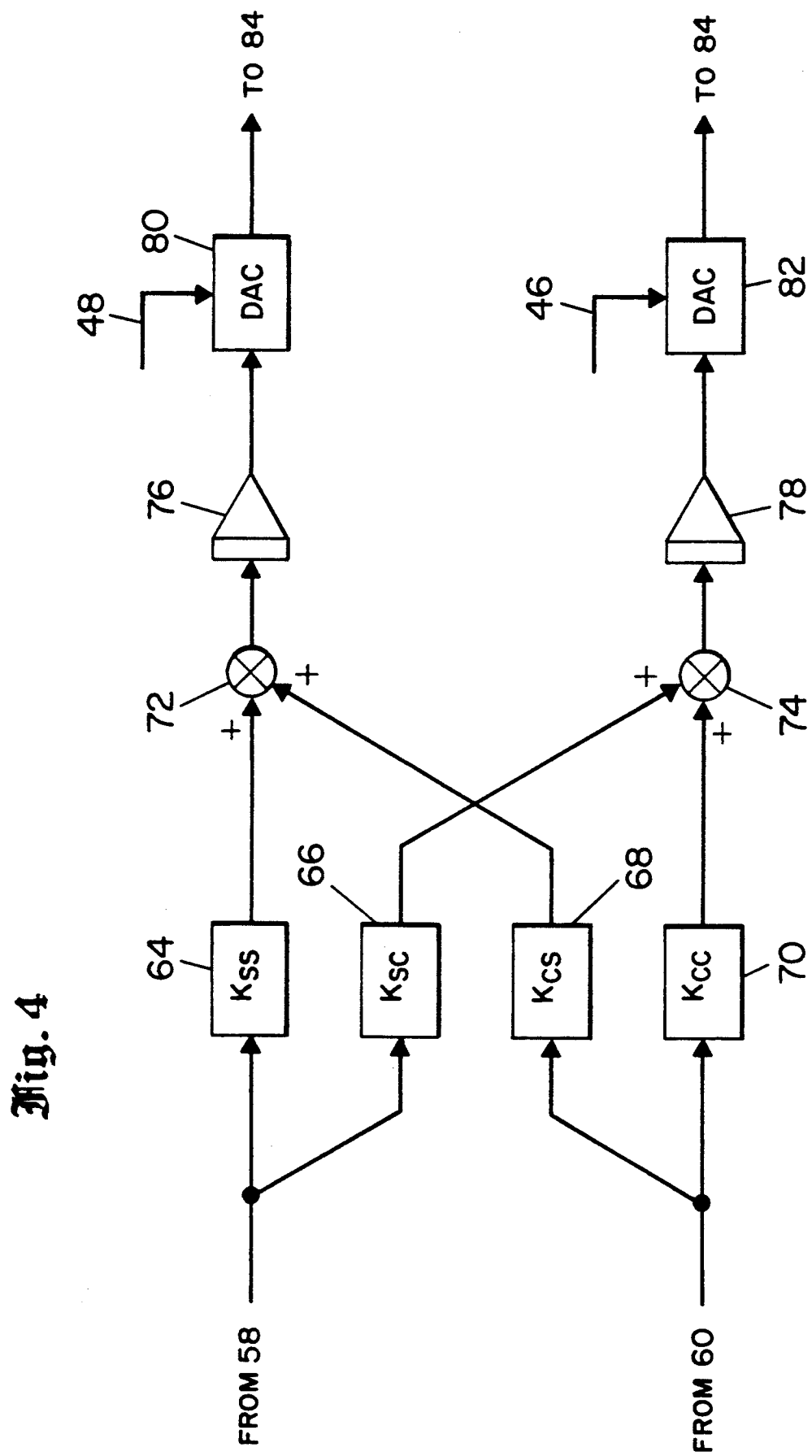
FIG. 4 is a diagram of the portion of the system of the invention for deriving virtual drive signals in accordance with detected cross-axis intermodulation.

FIG. 4 is a detailed schematic representation of a cross-axis frequency response model in accordance with the invention. While such apparatus is employed to derive both virtual cross-axis frequency drive signals (i.e. the sine and cosine components), the y/x model 38 of FIG. 2 is illustrated for compatibility with the outputs of the preceding detailed illustration of the y-demodulator 34. However, it should be kept in mind that all other cross-axis models are configured consistent with the design of the y/x model 38, just as all demodulators are configured consistent with the demodulator illustrated in FIG. 3. Modifications to other axes will be apparent to those skilled in the art.

The y/x model 38 is provided for deriving (and hulling) the amplitude and phase of a drive signal at frequency $\omega_y$ which, applied directly to the x-gyro 18, would generate a pickoff signal (alternatively, actual gyro minus pickoff signal) with the same y-frequency content as that actually detected. The matrix includes the gain blocks 64, 66, 86 and 70 that act as reverse, or output-input, models of the response of the x-axis gyro and flexure system to a drive at frequency $\omega_y$. Since the sampled outputs of the integrators 56 and 60 characterize the actual pickoff motion at frequency $\omega_y$, the gain blocks 64 through 70 perform linear output-to-input transformations to derive the equivalent or virtual drive signal at frequency $\omega_y$. All four gain blocks shown in FIG. 4 are required to model the phase shifts that occur in a gyro and flexure system driven near resonance. The outputs from integrators 58 and 60 are combined by means of the gain blocks 64 through 70 to effect the appropriate phase shifts. The gains in 64 and 68 represent (inverted) estimates of the contribution of the sin(-$\omega_y$t) drive to the pickoff signal while gains 66 and 70 represent the contribution of the cos($\omega_y$t) drive. The values of the gain blocks are based upon known characteristics and empirical measurements of the x-gyro-and-flexure in accordance with well-known techniques for modeling spring-and-mass systems.

The outputs of gain blocks 64 and 68 are combined at a summing node 72. The resulting signal therefore represents a "reconstruction" of the sin($\omega_y$t) component of a "virtual" drive signal. The outputs of gain blocks 66 and 70 are similarly combined at a node 74 to provide the cos($\omega_y$t) "virtual" drive signal.

The gain blocks 64, 66, 68, and 70 are configured with implicit negative signs so that the virtual drive signals obtained at the nodes 72 and 74 represent the amount of drive necessary to null the cross-coupling. That is, when the drive signal components created with reference to the apparatus of FIG. 4 are applied to the x-gyro 12, they will tend to cancel the $\omega_y$ component of the gyro pickoff motion that results from cross-coupling of the y-gyro 14 drive at $\omega_y$. The same process with respect to the z-dither cross-coupling will eliminate $\omega_z$ frequency components in the x-gyro pickoff signal. Similarly, this hulling procedure may be performed with respect to other gyros to minimize or eliminate the measured intermodulation from the other axes' pickoff signals.

Referring back to FIG. 4 in detail, the outputs of the summing nodes 72 and 74 are applied to integrators 76 and 78 respectively. These integrators, unlike the integrators of a demodulator, are not reset at each sampling interval. Rather, they update their outputs each time a virtual drive signal is received from nodes 72 and 74. The integrators 76 and 78 attain steady states as the derived virtual signals tend toward "zero" values; that is, when the $\omega_y$ component of the x-axis pickoff (alternatively, actual gyro minus pickoff) signal is nulled.

The outputs of the integrators 76 and 78 are applied as digital coefficients to the multiplying (digital-to-analog converters (DAC's) 80 and 84, respectively. (The paired DAC's 80 and 82 correspond to the single DAC 42 of FIG. 2.) The sine wave sin($\omega_y$t) is applied to the multiplying DAC 80 while the cosine wave cos($\omega_y$t) is applied to the DAC 82. The DAC's 80 and 82 set the amplitudes of the cross-axis sin($\omega_y$t) and cos($\omega_y$t) drives respectively. Thus, the outputs of the multiplying DAC's 80 and 82 are the ninety degree out-of-phase sinusolds at frequency which, taken together and applied to the x-gyro 12, will null the $\omega_y$ component of the x-pickoff signal (alternatively, null the y-frequency motion of the instrument block about the x-axis).

The sine and cosine outputs of the DAC's 80 and 82 are applied to a summing node 84. As shown in FIG. 2, the outputs of the two processing paths 30 and 32 along with the direct axis drive (at frequency $\omega_x$) are combined at the node 84. This produces a sinusoidal drive signal containing a component at the assigned x-axis drive frequency as well as the derived, virtual or nulling components at the cross-axis frequencies.

The process described above continues and the hulling components of the three gyroscope drive signals are incrementally adjusted in accordance with the invention until such time as the undesired intermodulation (or block motion) is eliminated from the pickoff signals.

As mentioned, the method and apparatus disclosed herein may be utilized to eliminate either signal intermodulation or block coning in accordance with the nature of the signal being analyzed and controlled (i.e. pickoff for intermodulation control, gyro output minus pickoff for block coning contro 1 ). In the event intermodulation is controlled, the presence of cross-axis drive signal components may result in the existence of some block coning. Such coning may be readily compensated in software and the accuracy of the navigation system improved in view of the elimination of pickoff intermodulation.

Thus is it seen that there has been brought to the inertial navigation art a new and improved apparatus and method for improving the accuracy of a navigation system of the type wherein a triad of ring laser gyroscopes are dithered with respect to a common instrument block. By employing apparatus in accordance with the invention, and by operating such apparatus in accordance with the method of the invention, one may obtain navigation information of greater reliability than has been obtainable in the past.

While this invention has been described with respect to a presently preferred embodiment thereof, it is by no means so limited. Rather the scope of the invention is only to be ascertained with reference to the set of claims that follows and includes all equivalents thereof.

What is claimed is:

1. A method for controlling cross-coupling in a navigation system of the type wherein a plurality of gyroscopes is dithered about a plurality of axes of rotation with respect to an instrument block, said method comprising the steps of:
   a) driving each of said gyroscopes at a distinct frequency whereby a predetermined drive frequency is associated with an axis of rotation; then
   b) measuring the resulting rotations; then
   c) demodulating said resulting rotations to determine the cross-axis frequency content of each; then
   d) deriving virtual drive signal components for each axis at said cross-axis frequencies; then
   e) combining said virtual drive signal components with said predetermined frequency for each axis to create a new drive signal for each axis; then
   f) driving said gyroscopes with said new drive signals; and then
   g) repeating steps a through f above.

2. A method as defined in claim 1 further characterized in that said distinct frequencies are separated by the inverse of the rotation sampling period.

3. A method as defined in claim 2 wherein the demodulating step further includes the step of deriving the Fourier series expansion coefficients of the cross-axis frequencies.

4. A method as defined in claim 3 wherein the step of deriving virtual drive signal components is further characterized by:
   a) calculating the response of said gyroscopes to the cross axis drive frequencies; then
   b) creating output-input models of said response for each of said gyroscopes; and then
   c) applying said Fourier series coefficients to said model.

5. A method as defined in claim 4 further characterized by dithering three gyroscopes about three orthogonal axes.

6. A method as defined in claim 5 wherein the step of measuring the resulting rotations comprises measuring the gyroscope pickoff signals.

7. A method as defined in claim 5 wherein the step of measuring the resulting rotations comprises measuring the block motion.

8. Apparatus for controlling cross-coupling in a navigation system of the type wherein a plurality of gyroscopes is dithered about a plurality of axes with respect to an instrument block wherein the improvement comprises:
   a) means for driving each of said gyroscopes at a distinct frequency;
   b) means for generating a signal responsive q to the resulting movement of each of said gyroscopes;
   c) means for demodulating each of said signals to determine the cross-axis frequency content thereof;
   d) means for deriving virtual drive signal components at said cross-axis frequencies; and
   e) means for combining said virtual drive signal components with said distinct frequencies.

9. Apparatus as defined in claim 8 wherein said means for driving each of said gyroscopes at a distinct frequency comprises a plurality of digital oscillators.

10. Apparatus as defined in claim 9 wherein said means for demodulating said signals includes means for determining the Fourier series expansion coefficients of the cross-axis frequencies in said signals responsive to the movements of said gyroscopes.

11. Apparatus as defined in claim 10 wherein said means for deriving virtual drive signal components includes an output-input model of the frequency response of the gyroscopes to the cross-axis frequencies.

12. Apparatus as defined in claim 11 wherein said means for generating a signal comprises a gyroscope pickoff.

13. Apparatus as defined in claim 11 wherein said means for generating comprises:
   a) a gyroscope pickoff; and
   b) means for subtracting the output of said pickoff from gyro output.

* * * * *